US012770344B2

(12) United States Patent
Noguchi

(10) Patent No.: US 12,770,344 B2
(45) Date of Patent: Oct. 20, 2026

(54) DISPLAY DEVICE, DISPLAY METHOD, AND COMPUTER PROGRAM

(71) Applicant: JVCKENWOOD Corporation, Yokohama (JP)

(72) Inventor: Hiroshi Noguchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 112 days.

(21) Appl. No.: 18/823,764

(22) Filed: Sep. 4, 2024

(65) Prior Publication Data

US 2024/0428531 A1 Dec. 26, 2024

Related U.S. Application Data

(63) Continuation of application No. PCT/JP2023/008959, filed on Mar. 9, 2023.

(30) Foreign Application Priority Data

Mar. 11, 2022 (JP) ................................. 2022-038011

(51) Int. Cl.
*G06T 19/00* (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS 12,223,104 B2 * 2/2025 LeBeau .................... G06T 11/00
2016/0292922 A1 10/2016 Kasahara
2021/0086075 A1 * 3/2021 Cockram ................ A63F 13/77
2021/0192799 A1 * 6/2021 Miura ...................... G06F 3/033
2023/0376161 A1 * 11/2023 Neff .................... G06F 3/04812

FOREIGN PATENT DOCUMENTS

JP 2020-106587 7/2020
WO 2014/188798 11/2014

OTHER PUBLICATIONS

International Search Report and Written Opinion for International Application Serial No. PCT/JP2023/008959 mailed on May 16, 2023, 8 pages.

* cited by examiner

*Primary Examiner* — Frank S Chen
(74) *Attorney, Agent, or Firm* — Amin, Turocy & Watson, LLP

(57) ABSTRACT

A display unit that displays a virtual space image; a detecting unit that detects an object present in a real space image; and a light-shield control unit that changes a transmission state of a region of the display unit in which the object detected by the detecting unit is visually recognized, transmitted through the display unit are included.

4 Claims, 5 Drawing Sheets

DISPLAY DEVICE, DISPLAY METHOD, AND COMPUTER PROGRAM

CROSS-REFERENCE TO RELATED APPLICATIONS

This application is a Continuation of PCT International Application No. PCT/JP2023/008959 filed on Mar. 9, 2023 which claims the benefit of priority from Japanese Patent Application No. 2022-038011 filed on Mar. 11, 2022, the entire contents of both of which are incorporated herein by reference.

BACKGROUND

1. Technical Field

The present disclosure relates to a display device, a display method, and a computer program.

2. Description of the Related Art

In recent years, by sharing a virtual reality (VR) space realized through the VR technology with multiple users, meetings, gaming, and shopping using the VR space, have been increasing. Users participate in a meeting or the like using a VR space by wearing a head-mounted display device (HMD) on their heads. Examples of such a display device include those described in JP-A-2020-106587.

When users participate in a meeting using a virtual space, various kinds of materials are displayed on a display screen arranged in the virtual space. However, if the resolution of the display device is low, definition of the material displayed on the display screen becomes low, and it becomes difficult for the users to read the material displayed on the display screen. Therefore, users have a desire to view materials using a display of their own personal computers that they are currently using.

SUMMARY

It is an object of the present disclosure to at least partially solve the problems in the conventional technology.

A display device according to the present disclosure includes a display unit that displays an image of a virtual space, a detecting unit that detects an object present in a real space, and a transmission control unit that changes a transmission state of a region of the display unit in which the object detected by the detecting unit is visually recognized, transmitted through the display unit.

A display method according to the present disclosure includes displaying an image of a virtual space on a display unit, detecting an object present in a real space, and changing a transmission state of a region of the display unit in which the detected object is visually recognized, transmitted through the display unit.

A non-transitory computer readable recording medium storing therein a computer program is disclosed. The computer program causes a computer serving as a display device to execute displaying an image of a virtual space on a display unit, detecting an object present in a real space, and changing a transmission state of a region of the display unit in which the detected object is visually recognized, transmitted through the display unit.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an embodiment of a display device, a display method, and a computer program according to the present disclosure will be explained in detail with reference to the accompanying drawings. The embodiment described below is not intended to limit the present disclosure.

Specific Configuration of Display Device

Figure 1:
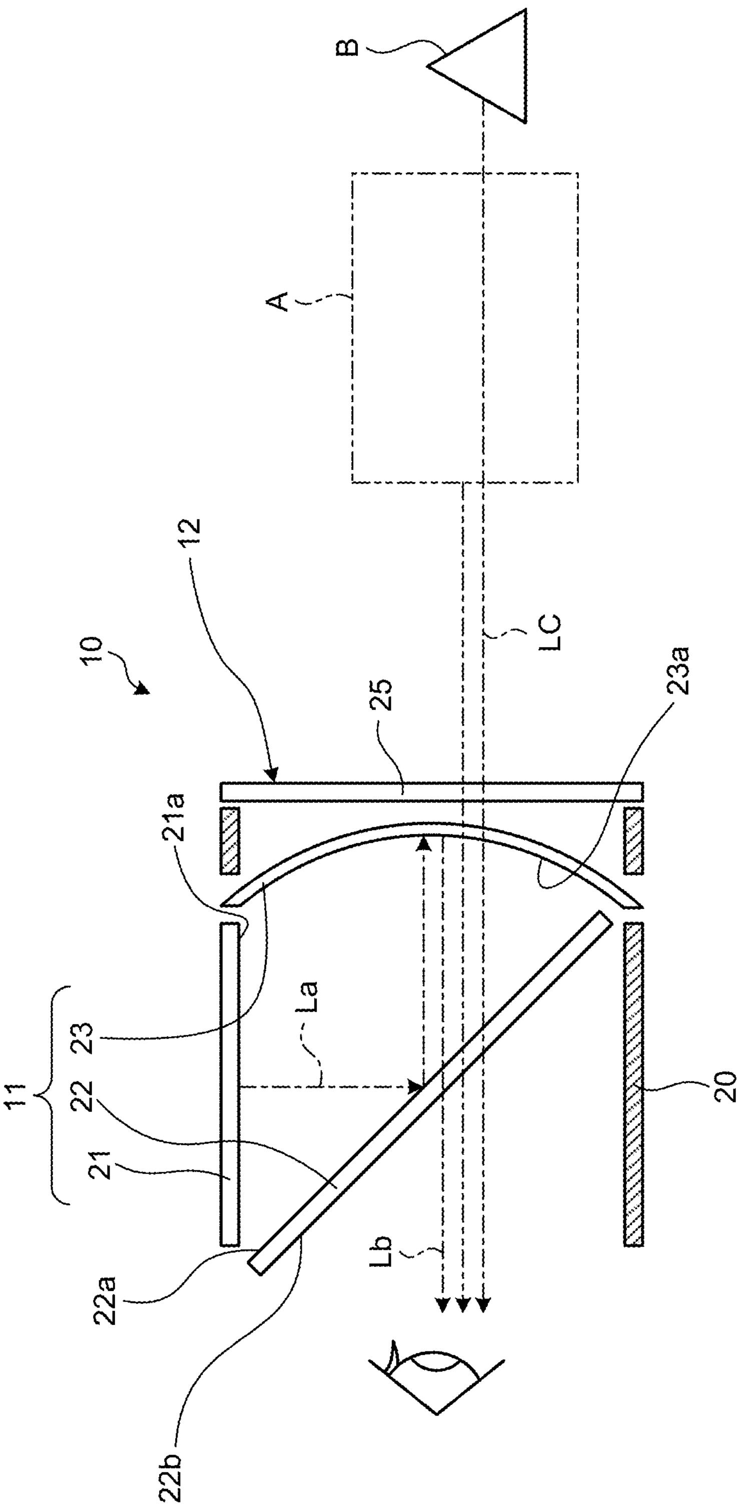
FIG. 1 is a schematic diagram illustrating a specific configuration of a display device according to the present embodiment.

FIG. 1 is a schematic diagram illustrating a specific configuration of a display device according to the present embodiment. In the present embodiment, it is explained applying a head-mounted display device to the display device, but it is not limited to this configuration.

As illustrated in FIG. 1, a display device 10 includes a display unit 11 and a light shield unit 12.

The display unit 11 is supported by an exterior casing 20. The display unit 11 includes a display panel 21, a half mirror 22, and a combiner mirror 23. The display panel 21 is arranged horizontally at an upper portion of the exterior casing 20. The display panel 21 has a flat shape, and various kinds of display panels, such as a liquid crystal panel, an organic EL panel, and a plasma panel, can be applied thereto. The display panel 21 includes a display surface 21*a* capable of displaying an image in a virtual space A on a lower surface. The display surface 21*a* can emit a display light La downward, that is, toward the inside of the exterior casing 20.

The half mirror 22 is arranged below the display panel 21 inside the exterior casing 20. The half mirror 22 is arranged to be inclined at a predetermined angle with respect to the display panel 21. The half mirror 22 has a reflective coating 22*a* provided on an upper surface side and an anti-reflective coating 22*b* provided on a lower surface side. The half mirror 22 reflects light from above, and transmits light from the front. That is, the half mirror 22 reflects the display light La emitted from the display panel 21 toward the combiner mirror 23. Moreover, the half mirror 22 transmits a reflected light Lb reflected on the combiner mirror 23 to the rear.

The combiner mirror 23 is arranged in front of the half mirror 22 inside the exterior casing 20. The combiner mirror 23 is arranged vertically at a front portion of the exterior casing 20. The combiner mirror 23 has a concave shape. The combiner mirror 23 has a reflective coating 23*a* provided on an inner surface side. The combiner mirror 23 reflects the display light La that has been emitted from the display panel 21 and reflected on the half mirror 22, to irradiates toward the half mirror 22 as the reflected light Lb.

The display unit 11 reflects the display light La emitted from the display panel 21 to the front using the half mirror 22, and reflects the display light La to the rear using the combiner mirror 23, to transmit as the reflected light Lb through the half mirror 22 to guide it to the eyeball of a user. Therefore, the user visually recognizes a virtual space image A displayed by the display unit 11 as if it is positioned in front of the display device 10.

Moreover, the combiner mirror 23 transmits a real image light Lc constituting a real space image B to the half mirror 22 side from outside to take it in. The real space image B is an image including a target object described later. The display unit 11 delivers the real image light Lc constituting the real space image B to left and light eyeballs of the user, transmitting it through the combiner mirror 23 and the half mirror 22. Therefore, the user directly views the image of the target object that is present in the real space image B.

At this time, the reflected light Lb (the display light La) generating the virtual space image A and the real image light Lc generating the real space image B reach the eyeball of the user. Therefore, the user visually recognizes a composite image in which the real space image B is superimposed on the virtual space image A.

The light shield unit 12 includes a light shield panel 25. The light shield panel 25 is supported along the vertical direction at a front portion of the exterior casing 20. The light shield panel 25 is arranged outside the combiner mirror 23 keeping a predetermine gap. The light shield panel 25 has a flat shape, and various kinds of display panel, such as a liquid crystal panel, an organic EL panel, and a plasma panel, can be applied. In the light shield panel 25, pixels are arranged in a matrix pattern, and each pixel can be adjusted and controlled from transparent to opaque. The light shield panel 25 is capable of adjusting and controlling the transmittance of an entire region or a designated part.

In the light shield panel 25, transparent pixel electrodes are arranged in an array on one side, and transparent counter electrodes are arranged on the other side, and a voltage according to a light-shield control signal is applied to each of the electrodes. The voltage of the light-shield control signal differs between a pixel corresponding to a light shield region and a pixel corresponding to a transmission region. Based on the light-shield control signal, each pixel of the light shield panel 25 shields or transmits the real image light Lc generating the real space image B. The light shield panel 25 can adjust the transmittance from 0% to 100% according to the light-shield control signal.

When the transmittance of the light shield panel 25 is 0%, the real image light Lc from outside generating the real space image B is shielded by the light shield panel 25, and the user visually recognizes only the real space image B. On the other hand, when the transmittance of the light shield panel 25 is 100%, the real image light Lc from outside generating the real space image B is entirely transmitted by the light shield panel 25, and the user visually recognizes the composite image in which the real space image B is superimposed on the virtual space image A. Moreover, when the transmittance of the light shield panel 25 is adjusted to a percentage between 0% to 100%, the transmittance of the real image light Lc from outside generating the real space image B is adjusted by the light shield panel 25, and the user visually recognizes a composite image in which the real space image B adjusted to have a predetermined transmittance is superimposed on the virtual space image A.

Processing Configuration of Display Device

Figure 2:
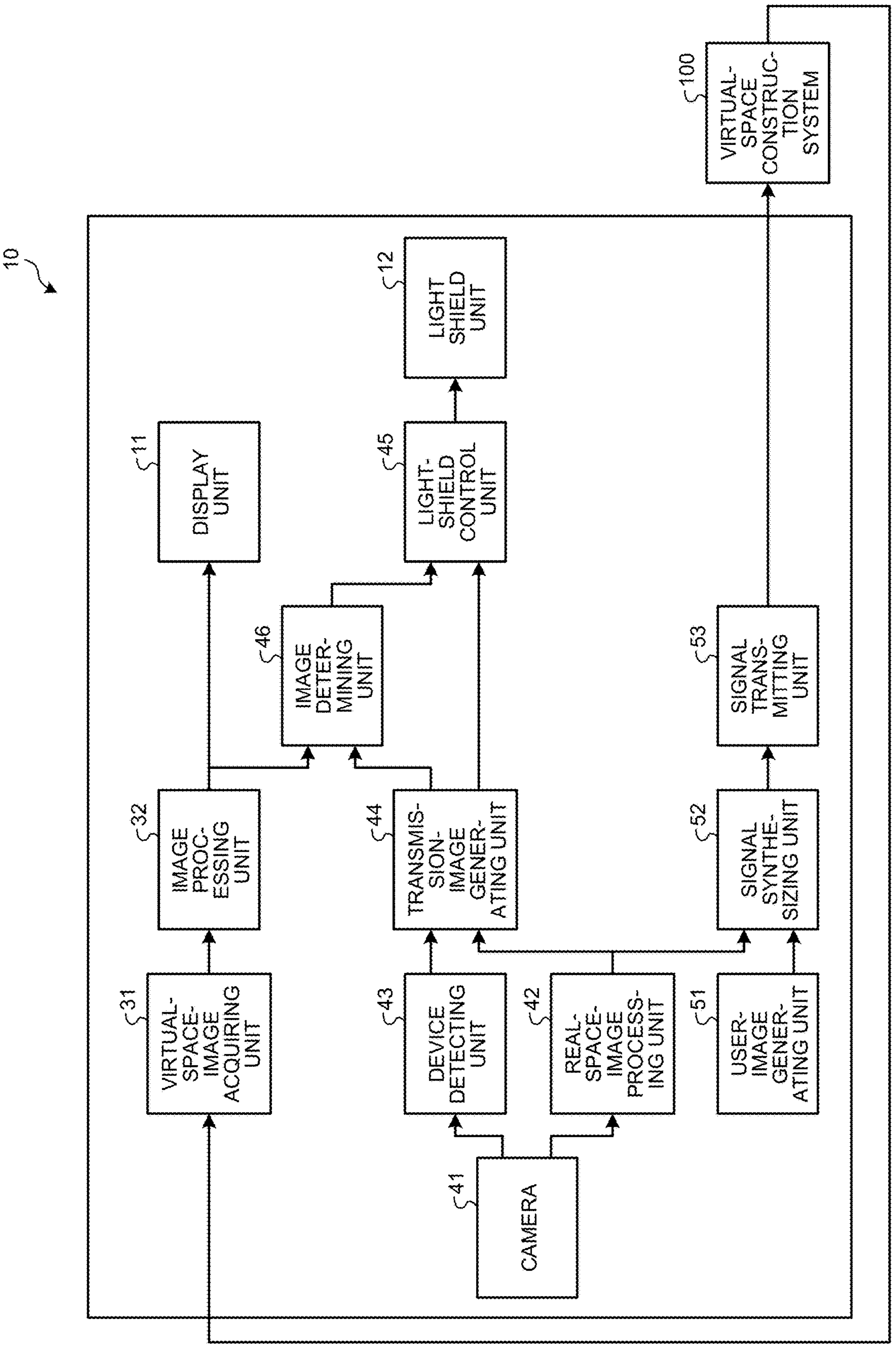
FIG. 2 is a block diagram illustrating a configuration of a display device according to the present embodiment.

FIG. 2 is a block diagram illustrating a configuration of the display device according to the present embodiment.

As illustrated in FIG. 2, the display device 10 performs transmission and reception of various kinds of information with a virtual-space construction system 100. The virtual-space construction system 100 generates information of a VR space. The virtual-space construction system 100 is, for example, a server or the like. Moreover, the virtual-space construction system 100 generates information of the VR space based on a three-dimensional model of an avatar that is generated by a personal computer of multiple users. The virtual-space construction system 100 outputs the information of the generated VR space to the display device 10.

The display device 10 displays an image in the VR space viewed from the user himself/herself together with the information of the VR space acquired from the virtual-space construction system 100.

The display device 10 includes a virtual-space-image acquiring unit 31, an image processing unit 32, a camera 41, a real-space-image processing unit 42, a device detecting unit 43, a transmission-image generating unit 44, a light-shield control unit 45, and an image determining unit 46 in addition to the display unit 11 and the light shield unit 12 described previously. Moreover, the display device 10 includes a user-image generating unit 51, a signal synthesizing unit 52, and a signal transmitting unit 53.

The image processing unit 32, the real-space-image processing unit 42, the device detecting unit 43, the transmission-image generating unit 44, the light-shield control unit 45, the image determining unit 46, the user-image generating unit 51, and the signal synthesizing unit 52 are constituted of, for example, at least one of a central processing unit (CPU), a digital signal processor (DSP), and a random access memory (RAM), a read only memory (ROM).

The virtual-space-image acquiring unit 31 is connected to the virtual-space construction system 100, and is connected to the image processing unit 32. The virtual-space-image acquiring unit 31 is, for example, a communication module, and is connected to the virtual-space construction system 100 and the image processing unit 32 through a network (for example, the Internet or the like). The virtual-space-image acquiring unit 31 acquires the information of the VR space from the virtual-space construction system 100. The virtual-space-image acquiring unit 31 outputs the information of the VR space acquired from the virtual-space construction system 100 to the image processing unit 32.

The image processing unit 32 generates display image data based on the information of the VR space, and outputs the display image data to the display unit 11 as a display signal. The display unit 11 displays the virtual space image A based on the display signal input from the image processing unit 32.

The camera 41 is a camera to perform simultaneous localization and mapping (SLAM). The camera 41 acquires an RGB image by imaging, and outputs it as a captured image data. The camera 41 is mounted on, for example, an HMD as the display device 10. To the camera 41, for example, a single-lens camera (a wide-angle camera, a fisheye camera, an omnidirectional camera), a multi-lens camera (a stereo camera, a multi-camera setup), an RGB-D camera (a depth camera or a Time-of-Flight camera) or the like is applied.

The camera 41 is connected to the real-space-image processing unit 42. The real-space-image processing unit 42 acquires the captured image data imaged by the camera 41. The real-space-image processing unit 42 performs visual SLAM processing using the captured image data, and performs mapping of the real space and self-positioning and head tracking estimation.

Moreover, the camera 41 is connected to the device detecting unit 43. The device detecting unit 43 acquires the captured image data imaged by the camera 41. The device detecting unit 43 detects various devices shown in an image of the real space by using the captured image data. The device includes a display of a personal computer, a keyboard, a mouse, and the like. The device to be detected is pre-set, and training data is stored. The device detecting unit 43 identifies a device using the training data by machine learning.

The real-space-image processing unit 42 and the device detecting unit 43 are connected to the transmission-image generating unit 44. To the transmission-image generating unit 44, a result of the real space mapping and a result of the self-positioning and the head tracking processed by the real-space-image processing unit 42, and a detection result of a device detected by the device detecting unit 43 are input. The transmission-image generating unit 44 generates the transmission image data based on the result of the real space mapping and the result of the self-positioning and the head tracking, and the detection result of the device. The transmission image data is image data that is partially or entirely transmitted through the display unit 11 to be displayed.

The transmission-image generating unit 44 is connected to the light-shield control unit 45. The light-shield control unit 45 sets the transmission region and the transmittance of the light shield unit 12 based on the transmission image data generated by the transmission-image generating unit 44. The transmission region and the transmittance of the light shield unit 12 are an area and the definition of the real space image B that reaches the left and right eyeballs of the user, transmitted through the display unit 11. The transmission region and the transmittance are pre-set, and are adjusted as necessary. For example, an initial transmission region is an area of 20% of the entire area of the display unit positioned at a intermediate position in a left-right direction at a lower part of the display unit 11. An initial transmittance is 70%. The light-shield control unit 45 outputs the transmission image data based on the transmission region and the transmittance to the light shield unit 12 as a transmittance signal. The light shield unit 12 transmits a predetermined region based on the light shield signal input from the light-shield control unit 45.

The image determining unit 46 is connected to the image processing unit 32 and the transmission-image generating unit 44. To the image determining unit 46, the display image data generated by the image processing unit 32, and the transmission image data generated by the transmission-image generating unit 44 are input. The image determining unit 46 determines whether a degree of change (for example, a change amount, a change rate) of the virtual space image A generated by the image processing unit 32 and displayed on the display unit 11 is smaller than a first threshold set in advance. Moreover, the image determining unit 46 determines whether a degree of change (for example, a change amount, a change rate) of the real space image B generated by the transmission-image generating unit 44 and displayed on the display unit 11 is smaller than a second threshold set in advance. The degree of change of the virtual space image A and the degree of change of the real space image B are differences in the number of pixels between two frame rates switched over time. In this case, they are expressed by a change amount in the number of pixels between two frame rates, or by a change rate in the number of pixels. The two frame rates may be consecutive or separated by a predetermined number of frame rates.

Moreover, the first threshold and the second threshold are set as appropriate. The first threshold is, for example, a difference in the number of pixels between frame rates of the virtual space image A that varies when images on the display screen are switched in a conference held in the VR space, or the like. Moreover, the second threshold is, for example, a difference in the number of pixels between frame rates of the real space image B that varies when image on a display of a personal computer are switched in the real space, or the like.

The image determining unit 46 is connected to the light-shield control unit 45. The image determining unit 46 outputs a determination result of the degree of change of the virtual space image A and a determination result of the degree of change of the real space image B to the light-shield control unit 45. That is, when it is determined that the degree of change of the virtual space image A is smaller than the first threshold, the image determining unit 46 outputs an adjustment signal to make the transmission region of the light shield unit 12 (the display unit 11) larger, or to make the transmittance of the light shield unit 12 (the display unit 11) higher, to the light-shield control unit 45. When it is determined that the degree of change of the virtual image A is smaller than the first threshold, and the degree of change of the real space image B is larger than the second threshold, the image determining unit 46 outputs an adjustment signal to make the transmission region of the light shield unit 12 (the display unit 11) larger, or to make the transmittance of the light shield unit 12 (the display unit 11) higher, to the light-shield control unit 45.

The light-shield control unit 45 changes the transmission region of the light shield unit 12 and the transmittance of the light shield unit 12 based on the determination result of the image determining unit 46. In the present embodiment, by changing the transmission region and the transmittance of the light shield unit 12 by the light-shield control unit 45, a transmission state of a region of the display unit 11 that is transmitted through the display unit 11 to be visually recognized is changed. However, it is not limited to this configuration. For example, it may be configured such that the display unit 11 includes the light shield unit 12, to change the transmission region and the transmittance of the display unit 11 by the light-shield control unit 45.

The image determining unit 46 may output the adjustment signal to narrow the transmission region of the light shield unit 12 (the display unit 11), or to reduce the transmittance of the light shield unit 12 (the display unit 11) to the light-shield control unit 45 when the degree of change of the virtual space image A is larger than the first threshold, or when the degree of change of the real space image B is smaller than the second threshold.

Moreover, the user-image generating unit 51 generates avatar data (three-dimensional data) of a user. The user-image generating unit 51 is connected to the signal synthesizing unit 52. The signal synthesizing unit 52 generates VR-space display-image data by combining the result of real space mapping, and the result of self-positioning and the head tracking processed by the real-space-image processing unit 42, and the avatar data of the user generated by the user-image generating unit 51.

The signal synthesizing unit 52 is connected to the signal transmitting unit 53. The signal transmitting unit 53 transmits the VR-space display-image data generated by the signal synthesizing unit 52 to the virtual-space construction system 100 as a stream signal.

The virtual-space construction system 100 displays a three-dimensional image based on the VR-space display-image data, that is, the avatar image of the user, at a predetermined position in a virtual communication space. The virtual-space-image acquiring unit 31 acquires information of the VR space from the virtual-space construction system 100, that is, an image signal of the virtual space that is shown in the real space, as viewed from an orientation of the face of the user as a stream signal.

Display Method

Figure 3:
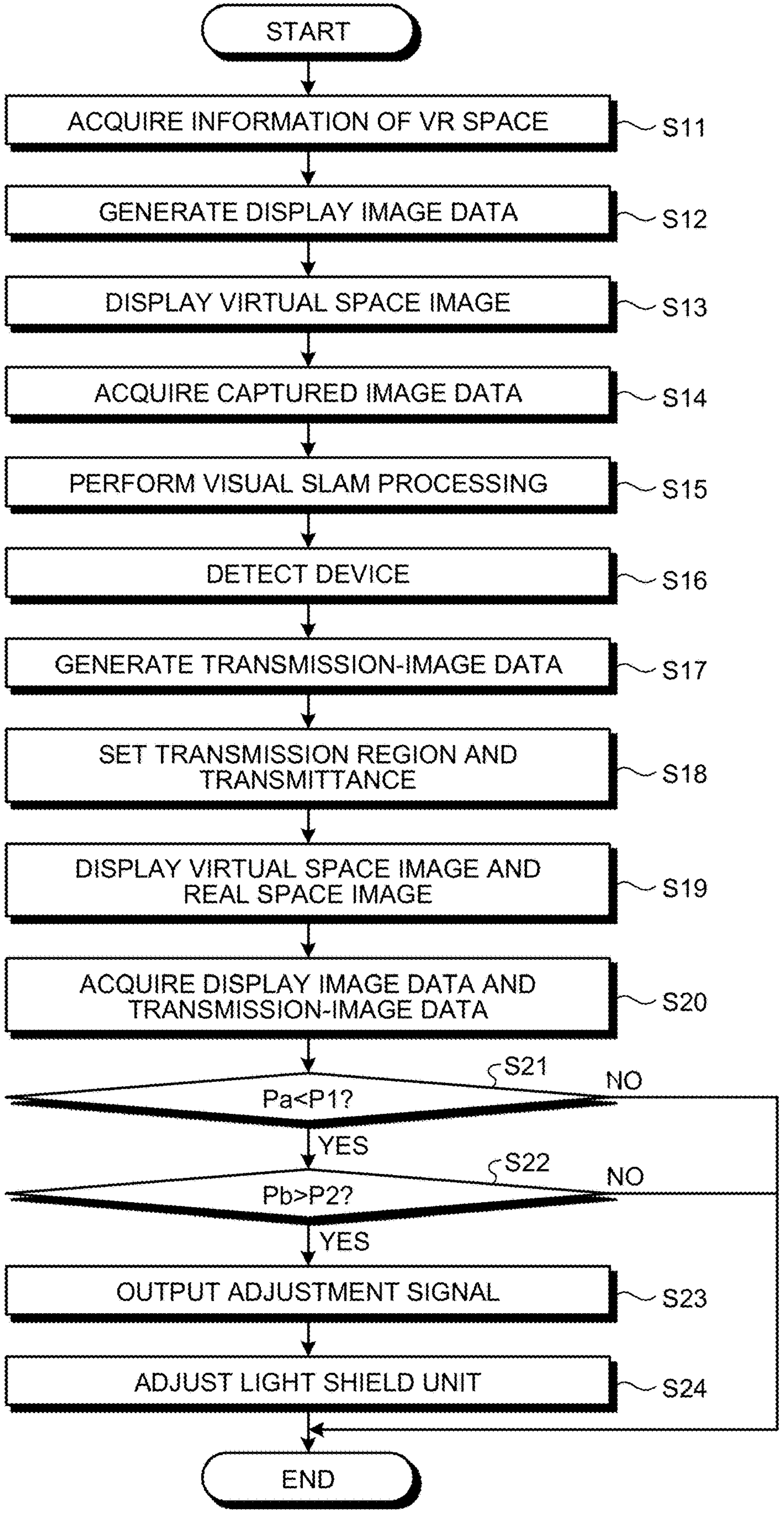
FIG. 3 is a flowchart illustrating a display method according to the present embodiment.
Figure 4:
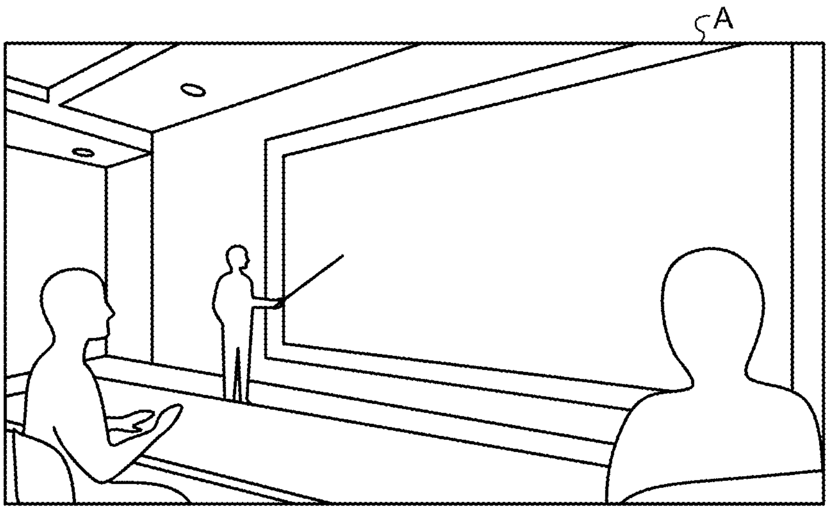
FIG. 4 is a schematic diagram illustrating an image in a virtual space.
Figure 5:
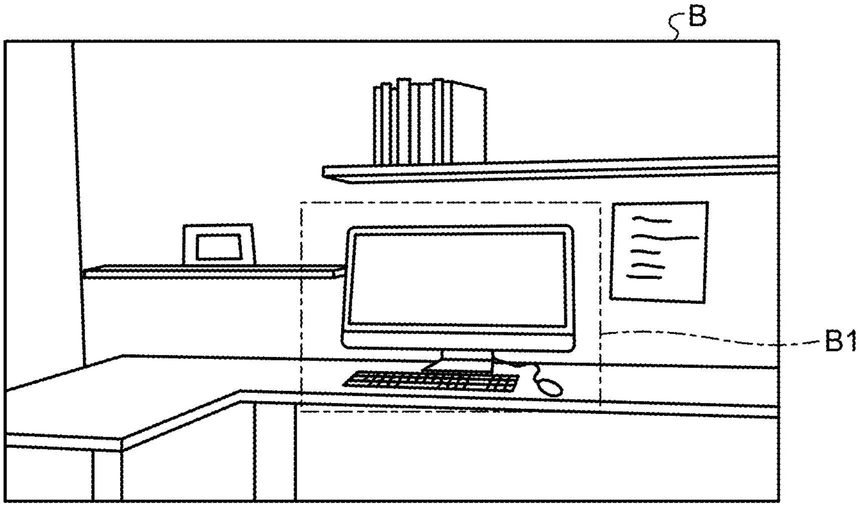
FIG. 5 is a schematic diagram illustrating an image in a real space.
Figure 6:
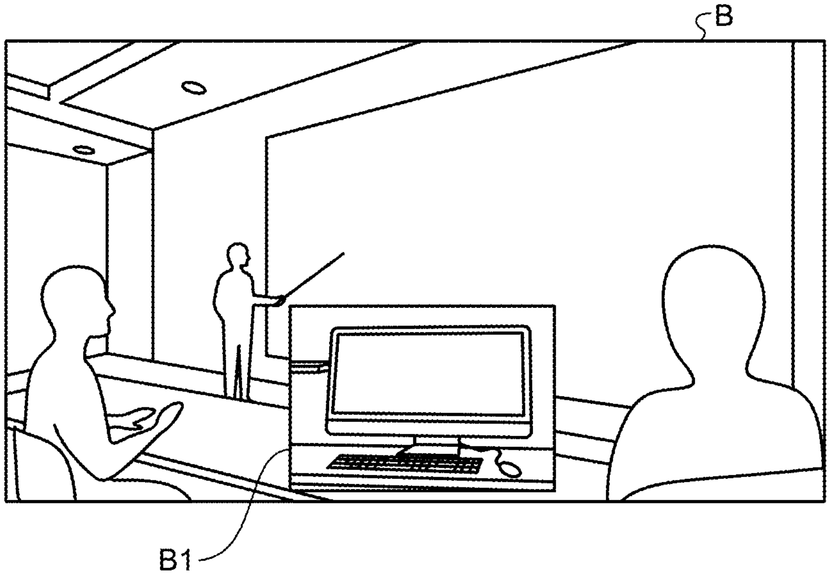
FIG. 6 is a schematic diagram of an image in which the image in the real space is superimposed on the image in the virtual space.

FIG. 3 is a flowchart illustrating a display method according to the present embodiment, FIG. 4 is a schematic diagram illustrating an image in a virtual space, FIG. 5 is a schematic diagram illustrating an image in a real space, and FIG. 6 is a schematic diagram of an image in which the image in the real space is superimposed on the image in the virtual space.

As illustrated in FIG. 1 to FIG. 3, at step S11, the virtual-space-image acquiring unit 31 acquires information of a VR space from the virtual-space construction system 100, and outputs it to the image processing unit 32. At step S12, the image processing unit 32 generates display image data based on the information of the VR information, and outputs it to the display unit 11. At step S13, the display unit 11 displays the virtual space image A based on the display signal input from the image processing unit 32. For example, as illustrated in FIG. 4, the virtual space image A is an image of a meeting in the virtual space, and is an image displaying avatars of multiple users through a screen.

At step S14, the camera 41 acquires an image of a region viewed by the user, and outputs captured image data to the real-space-image processing unit 42 and the device detecting unit 43. At step S15, the real-space-image processing unit 42 performs the visual SLAM processing using the captured image data of the camera 41, and performs mapping of the real space, and the self-positioning and the head tracking estimation, to output to the transmission-image generating unit 44. On the other hand, at step S16, the device detecting unit 43 detects and identifies various kinds of devices (a display of a personal computer, and the like) using the captured image data of the camera 41, to output to the transmission-image generating unit 44.

At step S17, the transmission-image generating unit 44 generates transmission image data based on the processed image that has been processed by the real-space-image processing unit 42 and the device detected by the device detecting unit 43, to output to the light-shield control unit 45. For example, as illustrated in FIG. 5, the real space image B is an image in front of the user. It is an image displaying a display of a personal computer, a keyboard, a mouse, and the like placed on a table. At step S18, the light-shield control unit 45 sets the transmission region and the transmittance of the light shield unit 12 based on the transmission image data generated by the transmission-image generating unit 44. At step S19, as a predetermined transmission region and a predetermined transmittance are set in the light shield unit 12, a real-space partial image B1 is input to the display unit 11 through the light shield unit 12.

When the light-shield control unit 45 sets the transmission region of the light shield unit 12 to an entire region, the user can view the virtual space image A display on an entire portion of the display unit 11, and can view the real-space partial image B1 displayed, transmitted through the entire portion of the display unit 11. That is, the user can view the real-space partial image B1 (FIG. 5) throughout the entire region of the virtual space image A (FIG. 4). Moreover, when the light-shield control unit 45 sets the transmission region of the light shield unit 12 to a part, the user can view the virtual space image A display throughout the entire portion of the display unit 11, and can view the real-space partial image B1 displayed, transmitted through a part of the display unit 11. That is, as illustrated in FIG. 6, a lower part of the virtual space image A, which is the image of the meeting in the virtual space, is partially cut out, and the user can view the real-space partial image B1 that is the image of the display of the personal computer, the keyboard, and the mouse in the cut-out region, At step S20, the image determining unit 46 acquires the display image data generated by the image processing unit 32 and the transmission image data generated by the transmission-image generating unit 44. At step S21, the image determining unit 46 determines whether the degree of change of the virtual space image A is smaller than the first threshold set in advance. That is, the image determining unit 46 determines whether a difference Pa in the number of pixels between frame rates of the virtual space image A is smaller than a first threshold value Ps1. When it is determined that the difference Pa in the number of pixels between frame rates of the virtual space image A is smaller than the first threshold value P1 (YES), the image determining unit 46 shifts to step S22.

At step S22, the image determining unit 46 determines whether the degree of change of the real space image B that is generated by the transmission-image generating unit 44 and is transmitted through the light shield unit 12 (the display unit 11) is larger than the second threshold. That is, the image determining unit 46 determines whether a difference Pb in the number of pixels between frame rates of the real space image B is larger than a second threshold value P2. When it is determined that the difference Pb in the number of pixels between frame rates of the real space image B is larger than the second threshold value P2 (YES), the image determining unit 46 outputs an adjustment signal to widen the transmission region of the light shield unit 12 (the display unit 11) or to increase the transmittance of the light shield unit 12 (the display unit 11) to the light-shield control unit 45.

On the other hand, at step S21, when it is determined that the difference Pa in the number of pixels between frame rates of the virtual space image A is not smaller than the first threshold value P1 (NO), the image determining unit 46 exits the routine without taking any more actions. Moreover, at step S22, when it is determined that the difference Pb in the number of pixels between frame rates of the real space image B is not larger than the second threshold value P2 (NO), the image determining unit 46 exits the routine without taking any more actions.

At step S24, the light-shield control unit 45 changes the transmission region of the light shield unit 12 (the display unit 11) or the transmittance of the light shield unit 12 (the display unit 11) based on the determination result of the image determining unit 46.

When the image determining unit 46 determines that the difference Pa in the number of pixels between frame rates of the virtual space image A is not smaller than the first threshold P1 (NO) at step S21, or when the image determining unit 46 determines that the difference Pb in the number of pixels between frame rates of the real space image B is not larger than the second threshold value P2 (NO) at step S22, the light shield unit 12 (the display unit 11) outputs an adjustment signal to narrow the transmission region of the light shield unit 12 (the display unit 11), or to reduce the transmittance of the light shield unit 12 (the display unit 11) to the light-shield control unit 45.

Effects of Embodiment

The display device according to the present embodiment includes the display unit 11 that displays the virtual space image A, the device detecting unit (detecting unit) 43 that detects an object in the real space image B, and the light-shield control unit (transmission control unit) 45 that changes a transmission state of the transmission region of the display unit 11 in which the object detected by the device detecting unit 43 is visually recognized, transmitted through the display unit 11.

Therefore, it is possible to display the virtual space image A on the display unit 11, and to display the object in the real space image B, transmitted through a partial region or the entire region of the display unit 11, and an image in the real space can be optically displayed at least in a part of the image in the virtual space.

The display device according to the present embodiment increases the transmission region of the light shield unit 12 (the display unit 11), or increases the transmittance of the light shield unit 12 (the display unit 11) when the degree of change of the virtual space image A is smaller than the first threshold set in advance. Therefore, it is possible to display the object in the real space image B clearly according to changes in the virtual space image A.

In the display device according to the present embodiment, the light-shield control unit 45 increases the transmission region of the light shield unit 12 (the display unit 11), or increases the transmittance of the light shield unit 12 (the display unit 11) when the degree of change of the virtual space image A is smaller than the first threshold and the degree of change of the real space image B is larger than the second threshold set in advance. Therefore, it is possible to display an object in the real space image B according to changes in the virtual space image A and changes in the real space image B.

The display device according to the present disclosure has so far been explained, but it may be implemented by various different forms other than the embodiment described above.

The respective components of the display device illustrated are of functional concept, and it is not necessarily required to be configured physically as illustrated. That is, specific forms of the respective devices are not limited to the ones illustrated, and all or some thereof can be configured to be distributed or integrated functionally or physically in arbitrary units according to various kinds of loads, usage conditions, and the like.

The configuration of the display device is implemented, for example, by a program loaded on a memory as software. In the embodiment described above, it has been explained as functional blocks implemented by integration of these hardware or software components. That is, these functional blocks can be implemented by various forms by only hardware, only software, or a combination of those.

According to the present disclosure, an effect that an image in a real space can be displayed in an optimal manner at least in a part of a image in a virtual space is produced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:

a display unit that displays an image of a virtual space; and at least one processor connected to a storage medium storing computer-readable instructions, the processor executing the computer-readable instructions to:

detect an object present in a real space; and change a transmission state of a region of the display unit in which the object detected is visually recognized, transmitted through the display unit, wherein the change increases the region or increases the transmittance of the display unit when a degree of change of an image in the virtual space is lower than a first threshold set in advance.

2. The display device according to claim 1, wherein the change increases the region or increases the transmittance of the display unit when a degree of change of an image in the virtual space is lower than a first threshold, and a degree of change of an image in the real space is larger than a second threshold set in advance.

3. A display method comprising:

displaying an image of a virtual space on a display unit;

detecting an object present in a real space;

changing a transmission state of a region of the display unit in which the detected object is visually recognized, transmitted through the display unit; and increasing the region or increasing the transmittance of the display unit when a degree of change of an image in the virtual space is lower than a first threshold set in advance.

4. A non-transitory computer readable recording medium storing therein a computer program that causes a computer serving as a display device to execute:

displaying an image of a virtual space on a display unit;

detecting an object present in a real space;

changing a transmission state of a region of the display unit in which the detected object is visually recognized, transmitted through the display unit; and increasing the region or increasing the transmittance of the display unit when a degree of change of an image in the virtual space is lower than a first threshold set in advance.

* * * * *